United States Patent [19]

Takao et al.

[11] 4,271,725
[45] Jun. 9, 1981

[54] HYDRAULIC MOTOR UNIT

[75] Inventors: Syosuke Takao, Tokyo; Gunpei Kikuchi, Kawasaki; Masuo Sekiguchi, Kawasaki; Shinji Kawauchi, Kawasaki, all of Japan

[73] Assignee: Ebara Corporation, Tokyo, Japan

[21] Appl. No.: 946,023

[22] Filed: Sep. 26, 1978

[30] Foreign Application Priority Data

Sep. 28, 1977 [JP] Japan .................. 52-116439

[51] Int. Cl.³ ........................... F16H 47/00
[52] U.S. Cl. ........................... 74/730; 74/789
[58] Field of Search ........... 74/677, 687, 720, 720.5, 74/730, 740, 789, 792; 192/3 TR

[56] References Cited

U.S. PATENT DOCUMENTS

| | | |
|---|---|---|
| 1,221,626 | 4/1917 | Tadey . |
| 2,215,671 | 9/1940 | Swennes ..................... 74/740 |
| 2,386,917 | 10/1945 | Thornton . |
| 2,557,485 | 5/1951 | Wagner . |
| 2,593,629 | 4/1952 | Swift ........................ 74/740 |
| 2,607,431 | 8/1952 | Buckendale . |
| 2,759,374 | 8/1956 | Bowman et al. . |
| 2,956,451 | 10/1960 | Bowman . |
| 3,005,359 | 10/1961 | Ahlen ....................... 74/677 |
| 3,055,237 | 9/1962 | Magnuson . |
| 3,107,987 | 10/1963 | Duer . |
| 3,115,204 | 12/1963 | Dence . |
| 3,150,532 | 9/1964 | Bixby . |
| 3,184,994 | 5/1965 | Stahl . |
| 3,188,888 | 6/1965 | Zink et al. . |
| 3,217,286 | 11/1965 | Carter et al. . |
| 3,222,954 | 12/1965 | Weertz . |
| 3,292,457 | 12/1966 | Horowitz ................... 74/730 |
| 3,319,492 | 5/1967 | Magnuson .................. 74/750 |
| 3,439,766 | 4/1969 | Dence et al. . |
| 3,459,070 | 8/1969 | Holdeman . |
| 3,880,017 | 4/1975 | Miyao et al. ............... 74/677 |

FOREIGN PATENT DOCUMENTS 1092281 11/1967 United Kingdom .

OTHER PUBLICATIONS

"Wheel Motor", Volvo Hydraulics Publication.

Primary Examiner—Kenneth Dorner
Attorney, Agent, or Firm—Oblon, Fisher, Spivak, McClelland & Maier

[57] ABSTRACT

A hydraulic motor unit is provided wherein a bent axis type axial piston motor having a high operating efficiency is incorporated while the compactness of the unit is maintained. The dimensional features of this invention are attained, in one aspect, from a special arrangement in which a multiple-plate type hydraulically actuated brake unit is disposed in an intermediate position between bearings supporting an output shaft of the hydraulic motor. Another aspect of such dimensional features of this invention resides in the arrangement such that the control valve unit, which can otherwise be a substantial obstacle in the installation work, is located neatly in a space made available by the specific construction peculiar to the bent axis type hydraulic motor unit so that the control valve unit may never become an obstacle in either installed on or removed from a machine or vehicle. In addition, there is provided an extra passage way to effect efficient circulation of the operating liquid throughout the hydraulic motor unit in order to prevent any local accumulation of heat in the operating liquid. When necessary, as in case of failure, there is provided a special arrangement in the reduction mechanism of the motor unit adapted to drive a vehicle or machine so that a vehicle or machine can be readily towed or caused to rotate by another rescue unit while leaving the hydraulic motor unit unturned and free from any substantial resistance.

12 Claims, 4 Drawing Figures

HYDRAULIC MOTOR UNIT

BACKGROUND OF THE INVENTION

The present invention relates in general to a hydraulic motor unit for use as a power drive source for a machine or a running vehicle. A variety of vehicles or machines are driven hydraulically by using a hydraulic motor unit, the most common applications being industrial vehicles of crawler type, or of wheel type such as a tractor, a bulldozer, a power shovel, etc., or hydraulically actuated winches to be installed on such industrial vehicles.

Such industrial vehicles as referred to above are generally adapted to heavy off-road use in irregular and rough areas, for example, in hilly areas or where there are many rocks or stones or greasy or slippery mud. To cope with such bad and irregular ground conditions, such industrial vehicles are generally crawler type or special heavy-duty tired wheel type. Under such conditions, these vehicles may occasionally encounter such obstacles on the ground during their services.

Such industrial vehicles generally use hydraulically actuated working members by way of such as a hydraulic actuator or cylinder unit for the purpose of operating a power shovel device or grading board in their field service, so such vehicles usually require a hydraulic energy or pressure source. In this respect, it is so convenient in practice to install a hydraulic motor unit for use as a power drive source. Since such a hydraulic motor unit is especially effective and suitable for a turning or steering operation of the vehicle by way of individually stopping either side of the endless crawler tracks which are generally arranged on both sides of the vehicle, or by driving both of such endless tracks in opposite directions, it is particularly advantageous to use such a hydraulic motor unit as a power drive source for such industrial vehicles.

When a hydraulic motor unit is used as a drive source in such industrial vehicles, should the hydraulic motor unit collide against an obstacle on the ground during operation, it may damage such hydraulic motor unit thus resulting in a breakdown. Therefore, it is preferable to design the whole hydraulic motor unit comprising such components as a hydraulic motor, reduction gears, braking mechanism, etc. so that the whole hydraulic motor unit may be included within the lateral dimensions of the crawler, so that it may not protrude therefrom, thereby reducing the risk of colliding with obstacles on the ground during operation.

As a running drive source of such vehicles, a hydraulic motor unit of axial plunger or piston type is generally advantageous in view of its generally high operating efficiency, or other advantageous operating properties. There are many applications using a hydraulic motor unit wherein various hydraulic motors including a reciprocating piston type are applied. For example, Japanese Patent Public Disclosure No. 108470/1974 discloses a radial piston type hydraulic motor unit and Japanese Utility Model Public Disclosure No. 82632/1977 discloses a hydraulic motor of swash-plate type axial piston pump. Among the plunger or piston type hydraulic motors, there is known that bent axis type hydraulic motor. There is shown the following table in Page 469 or "Yuatsu-Kuuatsu Binran" (Hydraulic-Pneumatic Pressure Technologies Handbook) which was compiled by the Japanese Institute of Hydraulic-Pneumatic pressure Technologies, and published Ohm, Inc., Tokyo Japan.

According to Table 1, it is appreciated that the bent axis type hydraulic motor exhibits the highest efficiency. In the case of the bent axis type hydraulic motor construction, it is obvious that the axis of the driving output shaft is not straight or is not aligned with the axis of the cylinder block which is adapted to drive the output shaft, and therefore, it is essential to arrange the cylinder block portion outside or beyond the span between the bearings which support the appropriate positions of the driving shaft. Therefore, it has been particularly difficult to design a hydraulic motor unit employing a bent axis type hydraulic motor which is compact in the longitudinal dimension. However, such compactness is important in the crawler driving hydraulic motor unit where there is a limit in the longitudinal or output (driving) shaft extension direction of the vehicle. In both of the above stated Japanese Patent and U.M. Public Disclosures, the axes are in aligned relationship with each other, and the piston block may be positioned between the shaft bearings, thus bringing the advantage that the resulting axial dimension may be made relatively short, thus bringing the longitudinal length within the desired limits.

In consideration of the advantageous features of the bent axis type hydraulic motor unit, it is is practicable to have it made short enough to be installable within the limits of a crawler construction, how advantageous it would be. The present invention is essentially directed to this end with the intention to employ a bent axis type axial piston motor having a high operating efficiency.

TABLE I

| | | Type | Displacement [cm$^3$/rev] | Max. Pressure [Kgf/cm$^2$] | max. r.p.m. | max. efficiency [%] |
|---|---|---|---|---|---|---|
| Rotary Type | Gear Motor | External Gear Type | 4–500 | 90–210 | 900–3500 | 65–85 |
| | | Internal Gear Type | 7–560 | 70–210 | 1800–7500 | 60–80 |
| | Vane Motor of Balancing Type | Ordinary Vane Type | 10–220 | 35–70 | 1200–2200 | 65–80 |
| | | Special Vane Type | 25–300 | 140–175 | 1800–3000 | 75–85 |
| Reciprocating Type | Axial Piston Motor | Bent Axis Type | 5–920 | 210–400 | 1000–6000 | 88–95 |
| | | Swash Plate Type | 4–500 | 210–400 | 1200–4000 | 85–92 |
| | Radial Piston Motor | Eccentric Type | 6–500 | 140–250 | 1000–1500 | 85–92 |

SUMMARY OF THE INVENTION

It is therefore a primary object of the present invention to provide an improved hydraulic motor unit having compactness in longitudinal dimension as well as a high operating efficiency.

It is another object of the present invention to provide an improved hydraulic motor unit which can be installed and removed with ease.

It is still another object of the present invention to provide an improved hydraulic motor unit construction in which the possibility of local temperature rises is substantially reduced.

It is a further object of the present invention to provide an improved hydraulic motor unit of such construction that when installed on a vehicle, there is a less chance of damage due to contact with obstacles or rough ground surface.

It is a still further object of the present invention to provide an improved hydraulic motor unit construction whereby maintenance may be easily carried out.

It is a still further object of the present invention to provide an improved hydraulic motor unit construction in which it is possible to have the crawler or vehicle tractable without rotating the hydraulic motor unit, when so required.

The above stated objects of the present invention can be attained in practice with an improved hydraulic motor unit construction according to this invention in which there is adopted a bent axis type hydraulic motor unit, the brake assembly being advantageously positioned in a space defined between bearings of the output shaft of the hydraulic motor, and the control valve unit being neatly disposed in a space made available by virtue of the bent axis type construction whereby the overall dimensions of the whole hydraulic motor unit may be substantially reduced and the arrangement of the reduction mechanism for power take-off is also greatly improved.

The construction of the improved hydraulic motor unit according to this invention is such that the speed reduction gears, hydraulic motor brake assembly, control valve unit, etc. so arranged that it is practically possible to install and remove the whole hydraulic motor unit as a unit onto or from an apparatus such as a crawler vehicle which substantial ease, and also in such a manner in case of application in a crawler drive, the hydraulic motor unit can be completely and safely housed within the breadth limits of the crawler track so that there is a substantially lessened possibility of damage due to contact with obstacles and rough ground surface.

The details of the present invention, as well as further objects and advantages thereof, will become more apparent from the following detailed description with respect to a preferred embodiment of the invention, when read in conjunction with the accompanying drawings, in which like parts are designated with like reference numerals.

DETAILED DESCRIPTION OF THE PREFERRED EMBODIMENT

Figure 1:
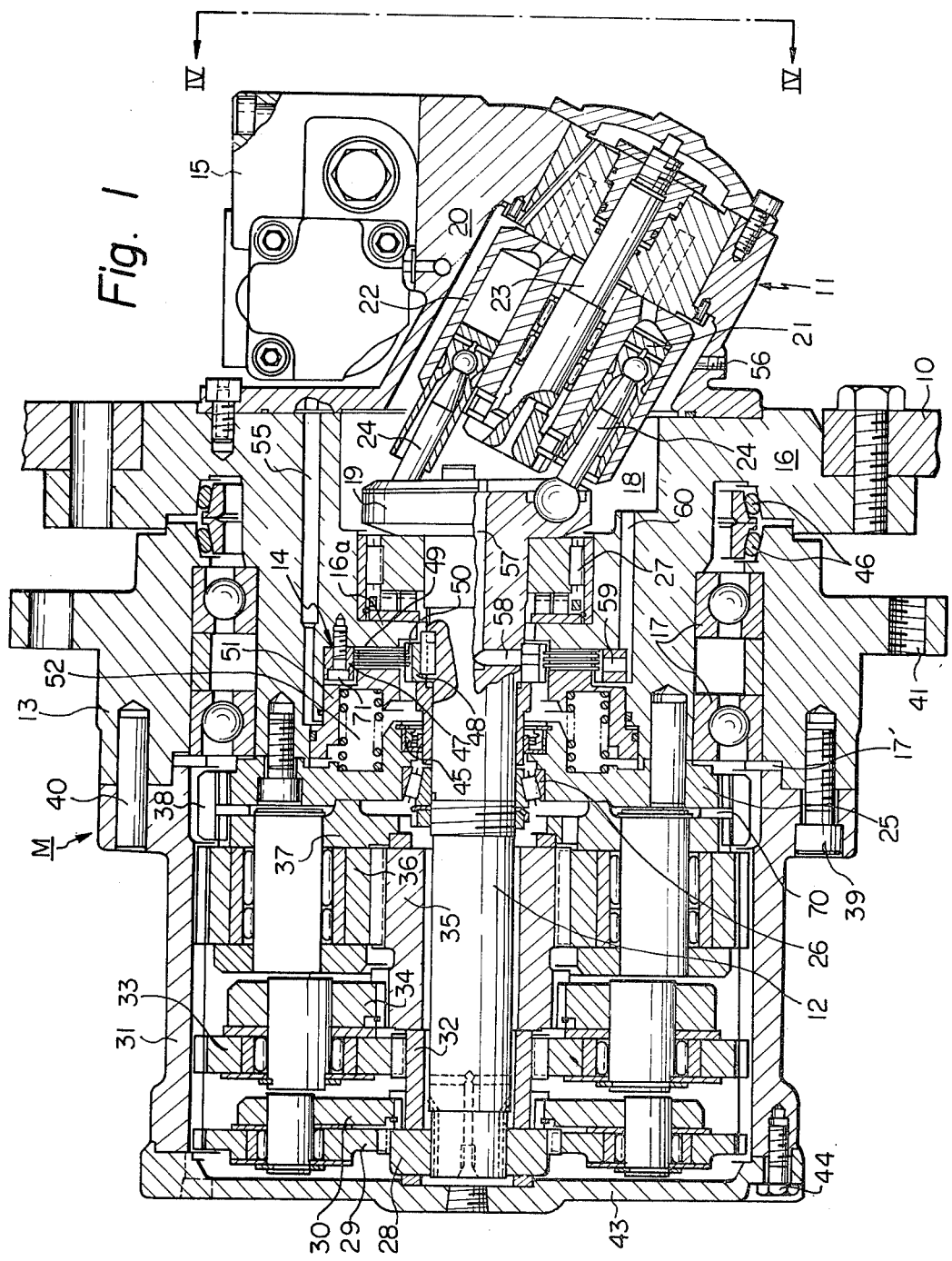
FIG. 1 is a vertical cross-sectional view of a hydraulic motor unit according to the present invention.

Referring first to FIG. 1, there is illustrated a vertical cross-sectional view of a hydraulic motor unit M by way of a preferred embodiment of this invention. The hydraulic motor unit M is illustrated so as to be detachably mounted on an apparatus such as a vehicle body 10 by using a suitable means such as bolts. The bent axis portion of the hydraulic motor is generally designated as 11, and is operatively connected in a slanting or inclined relationship to a driving shaft 12. The driving shaft 12 is adapted to drive a rotating barrel or sleeve 13 through a reduction mechanism to be explained later. The rotating barrel 13 is adapted, to directly drive, for example, the wheel of a vehicle or to drive the crawler through a sprocket wheel mounted on the rotating barrel 13.

There is also provided a brake assembly 14 in an operative relation with the driving shaft 12, and also there is provided a control valve 15 as an integral part of the hydraulic motor unit for controlling the operation of the motor unit.

The rotating barrel 13 is supported rotatably by bearings 17 which are disposed on the outer circumference of a barrel housing 16 for encasing the driving shaft 12 and the brake assembly 14 therein. The housing 16 is constructed so the bent axis portion 11 can be installed at its right end portion as viewed in FIG. 1. There is provided an open chamber 18 at the right end of the housing 16, in which chamber the driving shaft 12 and rotating component members within the bent axis portion 11 to be described later are operatively connected with each other through a driving plate 19. In more detail, the casing 20 of the bent axis portion 11 includes a plurality of plungers or reciprocating pistons 21 therein, and there is provided a cylinder block 22, which includes a plurality of cylinders adapted to guide the reciprocating motion of the pistons, in a rotatable fashion on and around a spindle 23 within the bent axis portion 11. Each portion 21 is operatively connected with a connecting rod 24, and when a hydraulic pressure is exerted on the piston 21, the reciprocating motion of the pistons within the cylinders is caused to transmit a rotating torque to the driving shaft 12. The cylinder block 22 rotates around the spindle 23 during the reciprocating motion of the pistons.

The casing 20 is formed with a flange which is connected with the barrel housing 16 mentioned above, and the flange is also designed to effectively seal in liquid-tight state the open chamber 18 when installed together thereto.

The opened left end portion of the barrel housing 16 is closed by an end cover plate 25, thus forming a closed chamber within the hydraulic motor by way of the control valve unit 15, the motor casing 20, and the barrel housing 16 all together. In installation of such members, there are of course provided appropriate seals, gaskets, O-rings, packings, etc., where necessary.

There is provided one bearing 26, as one of the bearings to rotatably support the driving shaft 12, in the end cover plate 25, and the other bearing 27 is installed in the barrel housing 16. The brake assembly 14 stated above is specifically designed to be placed in a space defined intermediate these two bearings 26 and 27 in an attempt to keep the whole hydraulic motor unit compact including the installation of the brake assembly.

The driving shaft 12 extends through the end cover plate 25 longitudinally toward the left as viewed in FIG. 1, and there is provided a speed reduction mechanism between the elongated extension of the driving shaft 12 and the rotating barrel 13. The above-mentioned speed reduction mechanism is preferably of a planetary gear system, which is to be further described below.

At the leading end, left extremity as viewed in FIG. 1, of the driving shaft 12, there is operatively connected a first sun gear 28 by way of splines. Around the outer circumference of the sun gear 28, there are rotatably supported a plurality of planet gears 29 on a carrier 30 which is rotatable on and around the driving shaft 12. The plurality of planet gears 29 are in mesh with an outer ring gear 31 and form a first speed reduction stage. The carrier 30 is splined to a second sun gear 32, and there are provided a plurality of second-stage planet gears 33 rotatably supported by a second carrier 34 and operatively in mesh between the second sun gear 32 and the ring gear 31. The carrier 34 of the second stage is splined to a third sun gear 35. On the outer circumference of the third sun gear 35, there are provided a plurality of third-stage planet gears 36 rotatably supported by a third carrier or spider 37 so that it may be in mesh with the third sun gear 35 and the ring gear 31. On the outer circumference of the third carrier 37, there are formed gear serrations or teeth, and the internal splines of a gear coupling connection ring 38 fit snugly in these serrations.

On the outer circumference of the end cover plate 25 of the hydraulic motor pressure chamber stated above, there is provided outer gear serrations, in which gear serrations the internal splines of the connection ring 38 are fitted so as to form an operative gear coupling among the third carrier or spider 37, the ring 38 and the end cover plate 25, and also the end cover plate 25 is operatively connected through the barrel housing 16 to a stationary portion such as the vehicle body 10. Therefore, the third carrier 37 is not caused to rotate, and consequently, the effect of the rotating motion of the third-stage planet gear 36 is to cause the ring gear 31 with the third carrier 37 serve as an anti-torque member, the rotating motion of the ring gear 31 being the final output from the speed reduction mechanism. Since the ring gear 31 is rigidly connected to the rotating barrel 13 by way of suitable means such as bolts 39, dowel pins 40, etc., the rotating force is transmitted to the rotating barrel 13 now made integral therewith. Then, through this rotating barrel 13, there is transmitted a torque to the driven side. For example, in the case of a crawler, the rotating motion of the rotating barrel 13 now effects to drive the crawler through the sprocket wheel connected to the barrel 13 by way of the bolts and flange holes 41 defined therearound.

Although the description was given on the preferred embodiment of the planetary gear system having three reduction stages as an example, it is apparent to those skilled in the art that the number of speed changing stages is optional according to the design specifications of such mechanism. In addition, as typically shown in part in FIG. 2, it is possible to change the number of gear teeth of the ring gear 31 shown in FIG. 1 so as to obtain a wider range of speed reduction by using the same stages of reduction. In more detail, in the embodiment of this invention illustrated in FIG. 1, the internal gear form or number of gear teeth of the ring gear is common over each of the reduction stages. In contrast, as typically shown in the ring gear 31' in FIG. 2, it is practically possible to form a different number of internal gear teeth on the opposite sides of the gear along the axial direction thereof by providing a recess of relief groove 42 for special gear teeth forming or cutting process, thus resulting in a wider range of selection of internal gear teeth to be formed therein, i.e., a wider selection range of speed reduction.

Figure 2:
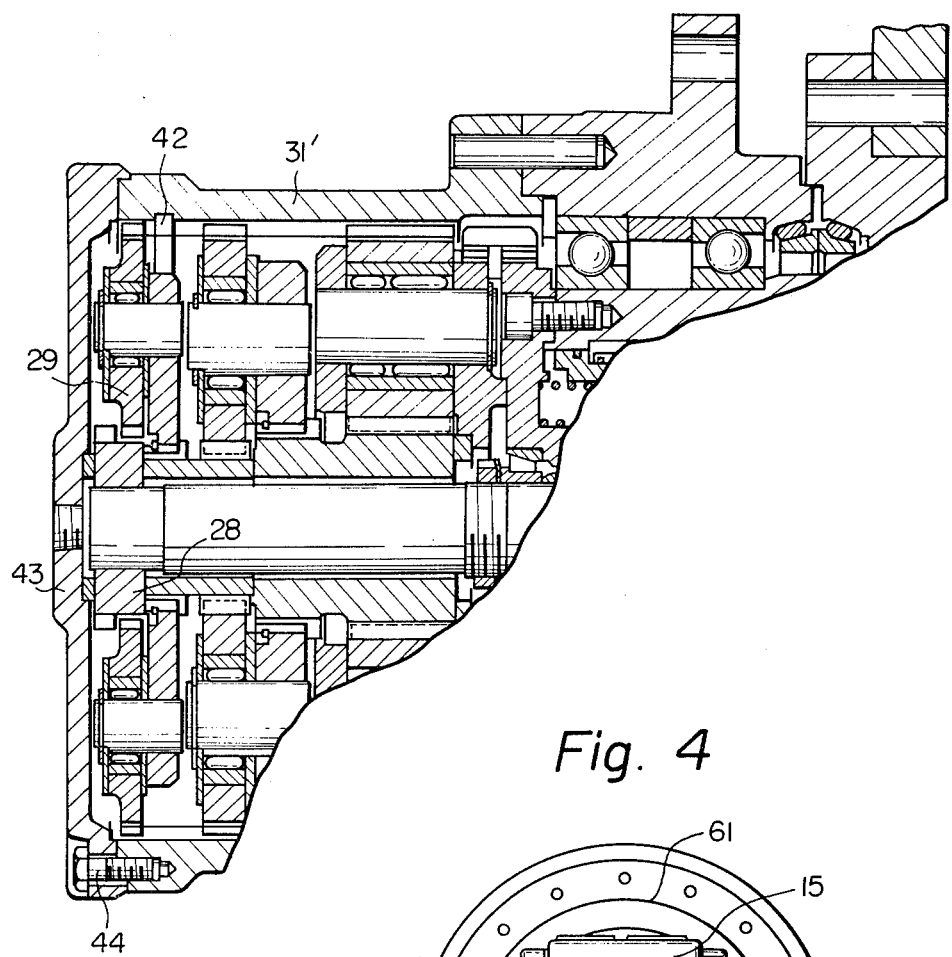
FIG. 2 is a fragmentary view similar to the view of FIG. 1 showing a possible variation of a speed reduction mechanism in a hydraulic motor unit shown in FIG. 1.

As to the construction of the ring gear, as typically shown in FIGS. 1 and 2, the ring gear 31 and 31' is formed as an integral piece, and consequently, in contrast to the conventional construction wherein the ring gears at several reduction stages are manufactured separately and combined together, there is no fear of loosening of the bolts which are used to secure the related gears especially at the low speed stage of the planetary gear system where a relatively greater torque is produced. Since the ring gear of this invention is formed to be a single unit, particularly in the case of the ring gear 31 as shown in FIG. 1, a special process such as centering operation during the cutting operation may effectively eliminated.

Now, referring back to FIG. 1, the ring gear 31 substantially constitutes a part of a covering means encasing the portion of the shaft 12 disposed outside of the hydraulic motor area and the planetary gear system disposed around the shaft 12. At the leftmost open end of the ring gear, there is installed an end cover member 43 by way of a suitable securing means such as bolts 44 so as to totally enclose the planetary gear system. In such arrangement, the end cover plate 25 is adapted to be a cover plate member for the planetary gear system at the opposite end thereof. In other words, this end cover plate 25 is a partition between the hydraulic motor section and the planetary gear system.

Reference is now made to the means adapted to positively hold against rotation the third carrier or spider 37 adapted to effect as an anti-torque member for the planetary gear system. In order to prevent any possibility of contact of the ring 38 with the adjacent rotation members, in this embodiment, the third planet gears 36, due to a possible longitudinal or axial travel of the ring 38 to the left 90 viewed in FIG. 1, there is formed an annular groove in the inner circumference of the ring 38, and an internal snap ring 70 which may resiliently expand its effective diameter is inserted snugly into this annular groove during the assembling operation of the related members. With such arrangement, this snap ring 70 engages the end cover plate 25 and the spider 37 and prevents possible play or travel of the ring 38 in the axial direction.

As fully explained hereinbefore, the end cover plate 25 rests in position between the reduction mechanism and the hydraulic motor, and therefore, it is convenient to provide lubrication for these components separately. It is the usual practice to provide the hydraulic motor section with its own operating oil for internal lubrication and to provide the planetary gear system with a heavy duty gear lubricating oil for lubrication. As stated above, since the driving shaft 12 extends longitudinally through the end cover plate 25, which serves as a partition between the two, and also the bearing 26 is provided in the end cover plate 25, it is essential to provide an appropriate seal so as to prevent the possibility of mixing different oils therebetween. For this purpose, a mechanical shaft seal 45 is provided in the end cover plate in such a manner that it may form a positive seal on and around the shaft extension area of the driving shaft 12. The hydraulic motor of this invention is of a bent axis type, and therefore, there is effected a radial reaction of the pistons 21 upon the bearing 26, so, when the seal 45 and the bearing 26 are installed in a coaxial relationship on the same end cover plate 25, it is preferable to dispose them at the part of the end cover plate 25 as illustrated where it has the greatest rigidity in its construction. Also, as explained hereinbefore since it is essential to have the longitudinal length of the whole hydraulic motor unit as short as possible, it is preferred that the seal 45 be located in the intermediate position between the bearings 26 and 27 of the driving shaft 12. For this purpose, there is provided a seal support extension for holding the seal 45 in position on the part of the end cover plate 25 extending toward the hydraulic motor, thereby to positively seal-off between the reduction mechanism and the hydraulic motor section. According to this arrangement, the bearing 26 in this embodiment, which is located in the left as viewed in FIG. 1, is now lubricated with the gear oil included in the planetary gear system. It is of course possible in practice to change the position of the shaft seal 45 in the left of the bearing 26, if there is a sufficient room to do so, so that it may be lubricated with the operating oil of the hydraulic motor. On the other hand, the rotating barrel 13 and the bearing 17 disposed between the barrel housing 16 are lubricated with the gear oil of the planetary gear system. The outer race of the bearing 17 should be prevented from an occasional movement in the axial direction of the hydraulic motor unit, and for this purpose, it is the general practice to provide especially high precision work to obtain an effect of preventing such movement of the bearing outer race. In this embodiment of the present invention, there is provided a retaining ring 17' in such a manner that the inner circumference area of the retaining ring may positively contact, when installed, with the outer race of the left end surface of the bearings 17 as viewed in FIG. 1, with resiliently deformed or slant of the inner area thereof toward the left so that both bearings 17 are installed with their outer races being under a positive biasing force or load to the right as viewed in FIG. 1.

With such an advantageous arrangement, it is not particulary required to perform any high precision work with respect to the axial direction on the part adapted to receive the outer races of the bearings 17 and an installation of the bearing is made easy.

Between the rotating barrel 13 and the stationary barrel housing 16, there is provided a floating seal 46, for the purpose of preventing possible leakage of the gear oil from the planetary gear system, and also for preventing entry of foreign materials such as sand, water, dust, etc. into the gear mechanism from outside.

Next, the brake assembly 14 is described. There is formed a flanged portion 16a in a generally middle portion of the barrel housing 16, and between this flanged portion 16a and the open chamber 18 stated hereinbefore, there is disposed the bearing 27. On the opposite side of the flanged portion 16a, there is mounted a brake securing ring 47 by using a plurality of bolts 71. The ring 47 has internal splines formed in the axial direction in its inner circumference. There is also provided a sleeve 48 having axial splines on its outer circumference in position of the driving shaft 12 corresponding to the location of the ring 47 in such a manner that it is rigidly keyed to the shaft 12 so they will rotate together. A plurality of ring-shaped stationary friction plates 49 having external splines on its outer circumference are installed in mesh with the internal splines of the ring 47, while a plurality of rotating friction plates 50 having internal splines on its inner circumference are likewise placed in mesh with the external splines of the sleeve 48. The number of friction plates 49 is one more than the number of friction plates 50, and these plates are stacked alternately one after another when installed. As is generally practiced in the multiple disc type clutch or brake construction, these friction plates 49 and 50 are splined to the ring 47 and the sleeve 48, respectively, in such a fashion that they can shift slidingly along the splines in the axial direction thereof. There is disposed a brake piston 51 slidingly shiftable in the axial direction between these friction plates 49, 50 and the end cover plate 25 of the hydraulic motor section. Also, a plurality of compression coil springs 52 are located between the brake piston 51 and the cover plate 25 in such a manner that these springs constantly urge the friction plates 49, 50 against the flanged portion 16a.

With such arrangement, the stationary friction plates 49 become engaged frictionally with the rotating friction plates 50, so that due to thus-produced frictional force, when the driving shaft 12 is imparted a rotating force or torque from the hydraulic motor, the rotating friction plates 50 are positively held in a stationary state, thereby effecting to prevent the rotation of the shaft 12, and consequently, this shaft cannot obtain any output from the planetary gear system. As this particular brake arrangement is, when considered from the aspect of the reduction mechanism, designed to effect on the part of the input area there is a high-speed yet relatively small torque, it is practically possible to efficiently make a zero output from the driving shaft 12 with a relatively small braking force, and therefore, it is possible to have a brake unit with relatively small dimensions.

Figure 3:
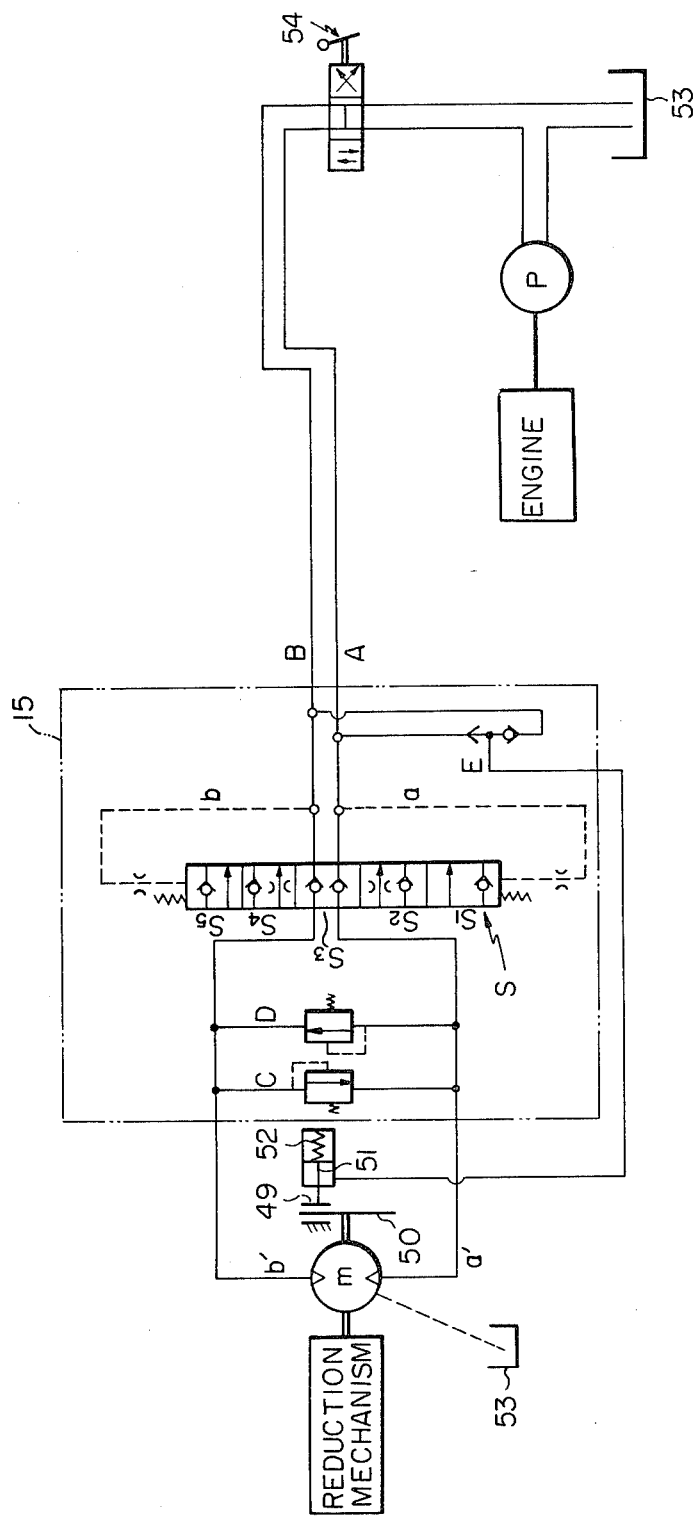
FIG. 3 is a schematic diagram showing a hydraulic circuit for use in the present invention.

Referring now to FIGS. 1 and 3, description is given on the operation of the hydraulic motor unit according to this invention. FIG. 3 is a schematic diagram only for explanation of the main parts of the hydraulic circuit of the hydraulic motor unit, in which there is also typically shown the operating function of the control valve 15 shown in FIG. 1. There is shown a hydraulic pump P which is a hydraulic energy or pressure source, and which is driven by a prime mover, such as an engine in the case of a running vehicle, and delivers an operating oil from a tank 53 through a shift valve 54 and the control valve 15 to the hydraulic motor m so as to rotate the same. The thus-produced rotation of the hydraulic motor m is taken off as an output through the reduction mechanism. When shifting the shift valve 54 to a right position, the liquid under pressure is fed into port A of the control valve 15, which pressurized liquid is directed through a liquid line a to an end of a spool valve S. The spool valve S which was held in a neutral position (Position $S_3$ in FIG. 3) is then shifted automatically to position $S_1$, and the pressurized liquid from line a is introduced into port a' of the hydraulic motor m, to drive the same and is discharged by way of port b'. The operating liquid discharged from port "b'" is delivered from port B of the control valve through the shift valve back to the tank 53.

When a vehicle, which employs, as a power drive source, the hydraulic motor unit according to this invention, is in a downhill operation, and when the hydraulic motor unit is caused to be rotated at a revolution speed higher than that made available from a normal hydraulically driving operation state produced by a rate of operating liquid delivered by the hydraulic pump P, in other words, in a self-running state, the hydraulic pressure in the circuits a—a' becomes negative or goes down thereby lowering the pressure urging the spool S so that the spool valve S is shifted to position $S_2$, and the operating liquid discharged from the hydraulic line is restricted or throttled by the spool valve in route, thus restricting the discharge of the hydraulic motor accordingly, whereby the rotating speed of the hydraulic motor unit is automatically adjusted at the rate duly corresponding to the delivery rate from the hydraulic pump. Thus, the spool valve S is recognized to have a so-called counter balancing function and this exhibits a braking function in the self-running state of a vehicle when the motor unit is installed to drive the vehicle or the like. Positions $S_4$ and $S_5$ of the spool valve S are of individual functional positions where the hydraulic motor m is caused to be driven in the reverse direction, that is, the case where the shift valve 54 is shifted over to the left position, then delivering the operating liquid from port B to the control valve 15.

The reference characters C and D designate relief valves, respectively. As stated hereinbefore, in the case that the discharge of the hydraulic motor m is restricted, or when the running vehicle is caused to be stopped quickly, these relief valves serve as safety valves which prevent an overload or excessive pressure in the hydraulic circuits.

A shuttle valve E is employed to supply the brake piston 51 with a pressurized liquid so as to release or disengage the brake unit kept in a braking effect under the biasing force of the springs 52 incorporated as a unit with the hydraulic motor m by supplying a relatively higher pressure upon comparing the pressures in the hydraulic circuits a and b. This shuttle valve E is operable to automatically release the engagement between the brake friction plates 49 and 50 by the pressurized liquid which is also applied to the hydraulic motor upon shifting the shift valve 54 to its operating position. In FIG. 1, there is shown the hydraulic liquid route at 55 which supplies the pressurized liquid from the shuttle valve E to the brake piston 51. When there is a liquid under pressure in the route 55, the brake piston 51 is caused to move to the left overcoming the biasing force of the springs 52, thus disengaging the friction plates 49 and 50 from each other. Incidentally, when the brake is released the operating liquid also flows between these friction plates, thus effecting lubrication of these plates.

For clarity, there is shown only a single hydraulic circuit in FIG. 3. However, in the actual arrangement as in the case when the hydraulic motor unit is installed on each side of the crawler vehicle, there is usually a pair of circuits in parallel. Two or more hydraulic circuits may be used, where necessary. It is also possible to add a pump pressure regulation valve as well as hydraulic circuits other than that used for driving the vehicle as practiced in the power shovel or bulldozer applications.

The inside of the hydraulic motor defined by the barrel housing 16, the hydraulic motor casing 21, the end cover plate 25 is filled up, like in the ordinary hydraulic motor construction, with the operating liquid leaked out from several portions, such leaked operating liquid being redirected to the tank 53 through a return line for recycle use. For this purpose, there is provided a discharging port 56 in the pump casing 20, from where the discharged liquid is fed back to the tank 53 through the return line. The operating liquid inside the hydraulic motor is caused to be heated by contact with the parts of the motor during its circulation. Such temperature rise is caused, for example, from passage of a high pressure liquid, by hitting or mixing action of the rotating members within the unit, by heat loss produced in the bearings, by friction in the seals, from heat generated in the friction plates, or the like. Thus, the temperature within the motor section may be maintained uniform only if the operating liquid is circulated smoothly and evenly throughout the hydraulic motor section. However, in practice, with the arrangement of the unit, the liquid tends to dwell certain places such as between the brake friction plates 49, 50 and the end cover plate 25, and this leads to a local temperature rise of the liquid. In this respect, special consideration is taken in design so that the liquid temperatures in the places where heat tends to accumulate as well as the temperature inside the open chamber 18 can be satisfactorily equalized. That is, a central passage way 57 is formed starting from the right end of the driving shaft 12 as viewed in FIG. 1, and running to near the location of the splined sleeve 48, and also there is provided a through-passageway 58 extending in the radial direction of the shaft 12 and the splined sleeve 48 therethrough, and crossing the central passage way 57 at the area where the friction plates 49 and 50 are disposed. Also, there is provided a liquid passageway 59 extending in the radial direction through the brake securing ring 47 at the point corresponding to the location of the passageway 58, and this passageway 59 and the open chamber 18 are intercommunicated with each other by way of a longitudinal passageway 60.

The liquid passageways 57, 58, 59 and 60 stated above serve the following functions. When the pressurized liquid is delivered by the pump P to the hydraulic motor m and the driving shaft 12 is rotated, the liquid within the passageways 58 and 59 is directed under the effect of centrifugal force toward the radially outward area, and, thus, the operating liquid is caused to be sucked to the left side as viewed in FIG. 1 from the chamber 18 through the radial passage was 57. The operating liquid flowing from the passageway 58 in the radially outward direction is now ejected out in the neighborhood of the friction plates 49, 50. At the same time, the rotating friction plates 50 tend to induce the operating liquid existing in the proximity of the shaft seal 45 as well as in the space including the area where the bearing 27 is located, together with the liquid passing through the passageway 58, to circulate to the chamber 18 through the passageways 59 and 60. With such an advantageous arrangement, the liquid which would otherwise stay in a stagnant state in the local corners can be effectively mixed and induced to circulate with the constant liquid flow under the effect of the centrifugal force generated by the rotation of the related elements, thus resulting in an even temperature distribution throughout the hydraulic motor section. Incidentally, such circulation of the operating liquid through the friction plates in the brake unit provides sufficient lubrication between the component plates when they are rotating.

As referred to hereinbefore, when installing the hydraulic motor unit according to this invention on the vehicle or machine to be driven thereby, the hydraulic motor unit can be installed or removed as a single unit, and this constructional feature is also advantageous particularly in the periodic maintenance or handling.

On the other hand, in the case of the conventional hydraulic motor units or radial piston type or swash-plate type, the axis of driving shaft is straight, and it is possible to use a shaft that is longer in either lateral direction (N.B.: with the bent axis type, the shaft cannot be lengthened in the opposit lateral directions). However, owing to such longitudinal construction aspect of the conventional hydraulic motor unit, the control valve is to be disposed on the member located in a coaxial relationship with respect to the longitudinal axis of the motor unit; accordingly it is essential to have the control valve unit located in a position that is relatively remote from the axis of the unit. Consequently, when installing the hydraulic motor unit, for example, onto the driven unit body 10 from left as viewed in FIG. 1 through a mount opening or hole providing in the body 10, it is quite likely that the location of the control valve may be such that it is beyond the range of the opening size of the mount hole as disclosed in the Japanese Utility Model Public Disclosure No. 82632/1977. Therefore, it is inevitable at installation or removal of the motor unit that the control valve be removed in advance to the operation of installation or removal of the motor unit. Such additional troublesome jobs increase the man-hours required for installation or removal, and also add to the chance of entry of foreign materials such as dust, sand, etc. into the hydraulic system of the hydraulic motor unit during such operation.

Figure 4:
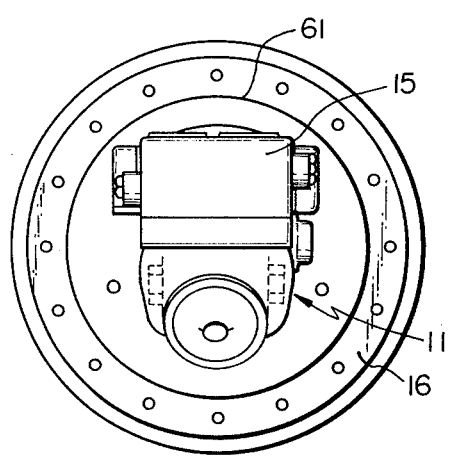
FIG. 4 is a rear end view excluding the main body portion of the hydraulic motor unit, when viewed in the direction shown by line IV—IV in FIG. 1.

In contrast this invention uses the bent axis type hydraulic motor in which the longitudinal axis of the hydraulic motor is bent with respect to the driving shaft 12. By virtue of such arrangement, it is practicably possible to have a substantial area in the space defined between the motor casing 20 and the longitudinal extension to the right of the driving shaft 12, in which space the control valve 15 can be mounted. FIG. 4 shows a rear end view excluding the body portion 10 viewed in the direction shown by arrows IV IV in FIG. 1. As is apparent from this drawing, the maximum outer diameter portion of the housing 16 to be mounted through the opening in the body 10 is shown at 61, within which outer diameter the bent axis portion 11 of the hydraulic motor unit and the control valve 15 are well encompassed. With such an construction, it is practically possible to install and remove the hydraulic motor unit together with the control valve on and from the body 10 without the necessity of removing the control valve unit at all prior to such installation or removal of the motor unit.

In addition, in the construction of the hydraulic motor unit special consideration has been given to readily coping with an accidental failure of the unit during its field service. For example, in the industrial vehicles in which this type hydraulic motor unit is employed, when the engine or hydraulic pump fails and the vehicle cannot run by itself, it is necessary that the stalled vehicle be towed or transported somehow by another vehicle. In this connection, as stated hereinbefore, the hydraulic motor unit of this invention is equipped with a brake assembly of a negative functional type, i.e., it can be released only when there is a hydraulic pressure in the brake circuit. Therefore, in the case that there is no hydraulic pressure, it is practically impossible to have the vehicle towed by another rescue vehicle.

In the above stated Japanese Utility Model Public Disclosure No. 82632/1977, there is disclosed a construction such that by using the screw provided in the center of the brake piston, it is possible to mechanically release the brake unit from outside, thus enabling it to be towed by another vehicle.

However, even if the stalled vehicle is towed by a rescue vehicle, there is still a problem left unsolved in that the driving circuit for the hydraulic motor unit is hydraulically locked by the function of the brake control valve unit incorporated therein. Therefore, it is necessary to release such hydraulic circuit by some suitable way. Should such hydraulically locked state be released by some suitable procedures, when the vehicle is towed, the hydraulic motor will now serve as a hydraulic pump so as to naturally generate circulation of the hydraulic oil throughout the hydraulic circuits in the unit. If such a failure of the unit is due to a failure in the hydraulic pump or in the hydraulic circuit elements due to foreign materials involved in such circuits, there still remains a risk that such foreign materials would be introduced into the hydraulic motor section, thus leading to another failure in the hydraulic motor unit, which otherwise may be kept undamaged. All of the inconveniences stated above encountered in the prior art construction are effectively eliminated by this invention.

In more detail, in the machine or vehicle in which the hydraulic motor unit according to this invention is incorporated, and when there occurs a necessity to have the machine or vehicle towed by a rescue vehicle or assisted by any means other than a hydraulic power, it is only required to remove the bolts 44 and the end cover plate 43, then reverse the engagement position of the first sun gear 28 by turning over the same as seen in FIG. 2, and thereafter place back the end cover plate 43 in its original position where it is secured as before. With such simple procedures, the first sun gear 28 is placed in a position so that it does not mesh with the first planet gears 29, and therefore, the ring gear 31 can now be rotated freely with the driving shaft 12 being left stationary, thereby making it possible to rotate or tow the stalled machine or vehicle when necessary. For this purpose, the splines or toothed portion of the first sun gear 28 extend only to the middle or half way of the total thickness of the first sun gear on either side thereof. With such special arrangement according to this invention, it is now possible to make the output member of the motor unit rotatable or the vehicle towable in an emergency, and therefore, there is no risk of making matters worse, e.g., of getting foreign materials in the hydraulic circuit of the hydraulic motor unit, even if the machine or vehicle is caused to be rotate or towed by any external rescue means.

On the other hand, in the case of Japanese Utility Model Public Disclosure No. 82632/1977, when the hydraulic motor section is inoperable because of heat seizure or the like so that the brake mechanism cannot be released mechanically (for instance, when the brake piston cannot be moved due to possible capture of foreign materials in its braking position), it is entirely impossible to have the machine or vehicle rotated or towed. In contrast, in such an emergency of the nature stated above, in the embodiment of this invention the machine or vehicle can be rotated or towed without any difficulties.

Since the construction of the hydraulic motor unit according to this invention is such as described above, it provides the advantages heretofore stressed with the increase in efficiency due to the employment of the bent axis type hydraulic motor. Also, the reduction mechanism employed in this invention provides a relatively wider range of speed reduction ratio selection. Also, due to the advantageous common construction of the ring gear incorporated over a plurality of reduction stages, there is obtained a substantial improvement in the fabrication while substantially eliminating the risk of loosening of the securing bolts otherwise involved in the conventional ring gear construction employed in the reduction mechanism of plural stages.

By virtue of the advantageous construction of the hydraulic motor unit according to this invention there is substantial improvement in the circulation of the operating liquid within the hydraulic motor unit, particularly in places where heat usually tends to accumulate, so, there is no fear of local "hot spots", thus resulting in substantially equal distribution of temperature throughout the hydraulic motor section.

With the advantageous arrangement according to this invention in which the brake assembly in snugly installed between the two bearings supporting the driving shaft, the overall dimensions, particularly the longitudinal dimension of the hydraulic motor unit can be decreased to such an extent that the hydraulic motor units may well be installed within the breadth limits of the crawler track. Furthermore, according to the advantageous construction of this invention in which the bent axis type hydraulic motor is incorporated, it is possible to install the control valve neatly in the rear space defined immediately above the bent axis portion of the hydraulic motor unit that is in the form of a structure slanting or inclined away from the elongated axis of the hydraulic motor unit. Therefore, it becomes convenient in the installation or removal of the hydraulic motor unit onto or away from the vehicle or other machine in that there is no necessity to remove the control valve, which in the conventional construction protrudes beyond the mounting limits.

Last but not least, when in an emergency it is required to have the crawler vehicle or other hydraulic machine, in which the hydraulic motor unit according to this invention is incorporated, towed or rotated by another rescue unit, it is readily practicable to do so without any troublesome adjustment and yet be free from any substantial increase in tractive resistance or rotational resistance during such rescue services.

The invention has been explained in detail referring to the embodiment illustrated in the accompanying drawings; however, it should be noted that further modification and alternation may be available to those skilled in the art without departing from the gist of this invention defined in the appended claims.

What is claimed is:

1. A hydraulic motor unit comprising:
   a bent axis type piston motor section adapted to generate torque when hydraulic pressure is applied and including
   a bent axis portion encasing a cylinder block rotatable around the axis thereof and pistons axially movable within said cylinder block;
   a barrel housing adjacent said bent axis portion and having a mounting base and a cylindrical portion;
   a driving shaft rotatably supported by two bearings within said barrel housing and adapted to be rotated by said bent axis portion, the axis of said shaft forming an angle relative to the axis of said cylinder block of said bent axis portion;
   a barrel rotatably supported on the cylindrical portion of said barrel housing;
   a planetary gear mechanism, disposed between said driving shaft and said barrel, a ring gear arranged to be rotatably coupled to said barrel to transmit the torque from said shaft to said barrel at a reduced speed;
   a brake assembly disposed around said shaft between said two bearings, and having a first part stationary relative to said housing, a second part rotatable with said shaft and a brake piston movable in a direction of the axis of said shaft, said first and second parts being arranged to engage and disengage with and from each other to regulate the rotation of said shaft depending on the movement of said brake piston; and
   a control valve for controlling the generation of said torque in said motor section as well as controlling the movement of said brake piston, said bent axis portion forming a space by virtue of the angular relationship relative said shaft, said valve being mounted on said barrel housing at a position adjacent said base and within said space.

2. A hydraulic motor unit as claimed in claim 1, further comprising a partition wall between said bent axis type piston motor section and said planetary gear mechanism and wherein one of said bearings is mounted in said partition wall, said shaft extending from said motor section through said wall and said planetary gear mechanism being disposed around the extended portion of said shaft.

3. A hydraulic motor unit as claimed in claim 2, further comprising shaft seal means positioned in said partition wall for isolating lubrication fluid between said motor section and said planetary gear mechanism.

4. A hydraulic motor unit as claimed in claim 2, said planetary gear mechanism further comprising spider means for supporting the planet coupled with said partition wall serving as anti-torque means for said planetary gear mechanism.

5. A hydraulic motor unit as claimed in claim 4, said planetary gear system comprising a multiple-stage speed reduction planetary gear system including a plurality of planetary gear sets positioned therein, and further comprising a high-speed stage disposed remote from said partition wall and a final low speed stage disposed adjacent said partition wall, said spider means comprising said anti-torque means and being incorporated in said final low-speed stage.

6. A hydraulic motor unit as claimed in claim 5, said partition wall and said spider means including gear teeth formed on the outer circumference thereon, respectively, and further comprising a ring member having internal splines coupling said partition wall and said spider means so as to form a gear coupling and a snap ring, said ring member being provided with an annular groove in the inner circumference for receiving said snap ring, said snap ring being placed snugly in said annular groove to engage said spider means and said partition wall so as to prevent said ring from moving in the axis direction.

7. A hydraulic motor unit as claimed in claim 5, said planetary gear mechanism further comprising a single outer ring gear arranged to mesh with planet gears in each of said sets.

8. A hydraulic motor unit as claimed in claim 7, said single ring gear having an annular recess formed therein as a relief for a gear teeth cutting operation in the portion corresponding to the internal gear circumference at an area midway thereof adjacent groups of said planet gears engage in meshing engagement therewith, wherein opposite internal gears formed in said ring gear are different from each other.

9. A hydraulic motor unit as claimed in claim 7 the high-speed stage including a sun gear disposed at the distal end of said shaft such that the axial length of the gear teeth is less than the thickness of said sun gear so that the teeth thereof do not mesh with the planet gears in said high-speed stage when said sun gear is reversely installed on said distal end.

10. A hydraulic motor unit as claimed in claim 8, the high-speed stage further comprising a sun gear disposed at the distal end of said shaft such that the axial length of the gear teeth is less than the thickness of said sun gear so that the teeth thereof do not mesh with the planet gears in said high-speed stage when said sun gear is reversely installed on said distal end.

11. A bent axis type hydraulic motor in which each component within the housing thereof is lubricated with operating liquid, comprising:
   a housing;
   an output shaft extending longitudinally of said housing therethrough at one end thereof and transmitting an output therefrom;
   a rotatable member hydraulically actuated and operatively connected to said output shaft in such a manner that the axis of said rotatable member is in inclined relationship with respect to the axis of said output shaft;
   two shaft bearings disposed in said housing for rotatably supporting said output shaft at two different positions;
   a brake assembly adapted to effect braking of the rotating motion of said output shaft and disposed in an intermediate position between said two bearings;
   hydraulic pressure supply means;
   an inlet port provided in said housing for introducing hydraulic pressure to said rotatable member; and
   an outlet port adapted to discharge operating liquid from said housing;
   said output shaft having a first opening formed therein along the axis thereof extending longitudinally from an end of the shaft within said housing to a position corresponding to an area where said brake assembly is located and a second opening formed therein extending in the radial direction across said output shaft at said position, whereby when said output shaft is driven, said operating liquid is forced to circulate through said inlet and outlet ports and through said longitudinal and radial openings from and to said hydraulic pressure supply means.

12. A bent axis type hydraulic motor means as claimed in claim 11, said brake assembly comprising a plurality of stationary friction plates nonrotatably mounted relative to said housing and movable in the axial direction of said housing;
   a plurality of rotatable friction plates mounted rotatably with said output shaft as a unit and also movable in the axial direction thereof, and stacked alternatively one upon another with said plurality of stationary friction plates;
   a piston operative to constantly urge said stationary and rotatably friction plates together;
   said piston being arranged to have frictional engagement between both of said plurality of stationary and rotatable friction plates only when said hydraulic pressure supply means is communicated therewith; and
   liquid passage means positioned between the area where said plurality of stationary friction plates are located and said outlet port.

* * * * *